United States Patent [19]

Chowaniec

[11] Patent Number: 5,230,725

[45] Date of Patent: Jul. 27, 1993

[54] MUTLI-LAYER TYPE MIST ELIMINATOR

[75] Inventor: James M. Chowaniec, Cape Coral

[73] Assignee: Munters Corporation, Fort Myers, Fla.

[21] Appl. No.: 989,531

[22] Filed: Dec. 11, 1992

[51] Int. Cl.⁵ .................... B01D 45/08; B01D 47/06
[52] U.S. Cl. ................... 55/440; 55/257.2; 55/257.3; 55/443; 55/444
[58] Field of Search ............... 55/257.3, 257.4, 440, 55/442–446, 257.2

[56]  References Cited
U.S. PATENT DOCUMENTS

| 4,157,250 | 6/1979 | Regehy et al. | 55/440 X |
| 4,204,847 | 5/1980 | Ko | 55/257.2 |
| 4,263,024 | 4/1981 | van der Vellen et al. | 55/257.2 X |

Primary Examiner—Charles Hart
Attorney, Agent, or Firm—Fitzpatrick, Cella, Harper & Scinto

[57] ABSTRACT

A mist eliminator for removing liquid droplets from a gas stream includes a first layer of a plurality of mutually parallel spaced partitions defining respective flow channels between the partitions. The partitions are curved to define the flow channels as circuitous paths of travel for gas. The partitions have free edge portions which define exit ports for the channels. A second layer of a plurality of mutually spaced partitions defining respective flow channels therebetween is located downstream of the first layer in the direction of air flow. The partitions of the second layer have inlet edges located in alignment with the exit ports of the first layer which are offset from the free edge portions of the partitions in the first layer. The inlet edges of the second layer are aligned with the direction of gas flow out of the exit ports of the first layer and the partitions of the second layer have main body portions extending at an angle to those inlet edges.

16 Claims, 4 Drawing Sheets

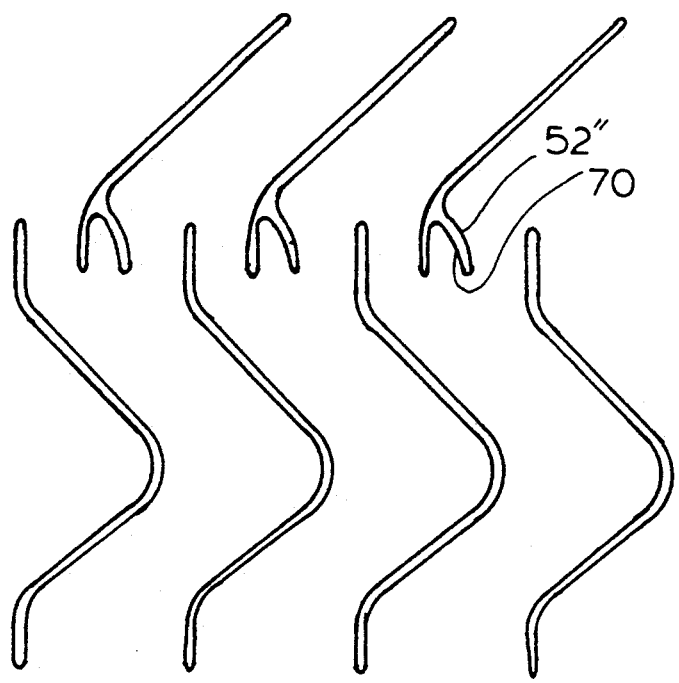
FIG. 6
FIG. 7
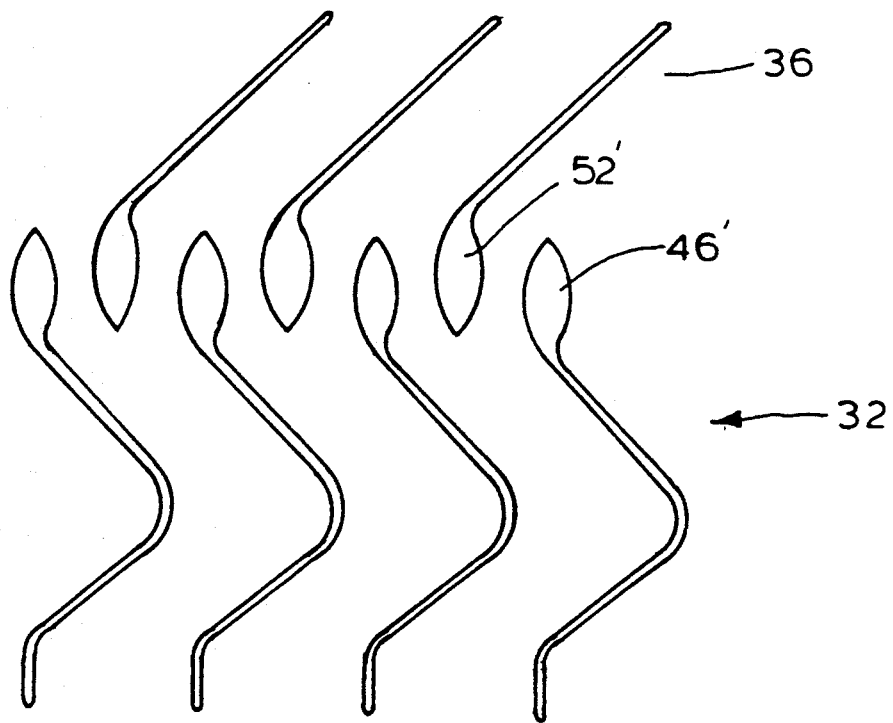

MUTLI-LAYER TYPE MIST ELIMINATOR

The present invention relates to devices for the removal of liquid droplets from a gas stream, and more particularly to an improved mist eliminator structure.

Mist eliminator structures are devices that are used to separate liquid droplets from a gas stream in which they are entrained. The typical mist eliminator is designed to induce changes in direction of a gas stream through flow passages defined between plates which may be corrugated or have otherwise irregular surfaces, and which may be further provided with liquid collection pockets. Such mist eliminators are disclosed, for example, in U.S. Pat. Nos. 3,953,183; 4,141,706; and 4,157,250. Such devices operate on the principle that repeated direction changes of a gas stream sub-divided into individual streamlets will cause the release of the droplets by inertia. That is, the inertia of the liquid droplets causes them to be carried against the walls of the plate as the direction of the gases change so that the droplets collect, accumulate and flow off of the plates.

In many applications, conventional mist eliminators are provided with banks of spray nozzles positioned below the mist eliminator body or pack which intermittently spray water into the mist eliminator body in order to keep the passages therein free from deposits of solid material carried by the gas stream. Sometimes spraying devices are also provided above the mist eliminator body, i.e., on the downstream side thereof for the same purpose.

It has been found that in so-called multi-pass eliminators, i.e., those in which multiple changes of direction are provided, it is often difficult for the intermittent spray washing to reach the inside of the eliminator and to dislodge deposits contained in the interior of the mist eliminator body.

It is an object of the present invention to provide an improved mist eliminator construction.

Another object of the present invention is to provide a mist eliminator construction in which the interior of the mist eliminator is accessible to spray washing.

Yet another object of the present invention is to provide a mist eliminator structure which can be opened to expose the interior surfaces of the mist eliminator for spray washing.

In accordance with an aspect of the present invention, a mist eliminator is provided for removing liquid droplets from a gas stream and which includes first and second layers of mutually parallel spaced partitions. The first layer of the mist eliminator body of the invention has partitions which have identical folded configurations defining circuitous flow channels therebetween for the gas. The partitions of the first layer have straight parallel exit edges defining exit ports therebetween for the flow channels.

The partitions of the second layer of the mist eliminator are offset from the partitions of the first layer so that the gases flowing from the channels of the first layer are divided into two adjacent channels of the second layer. The second layer of the mist eliminator is located downstream of the first layer in the direction of air flow and its partitions have inlet edges located in alignment with the exit ports and offset from the exit edges of the partitions in the first layer. The inlet edges of the second layer are flat and located generally parallel to the exit edges of the first layer so as to be aligned with the direction of gas flow out of the exit ports. The partitions of the second layer have a main body portion extending at an angle to the inlet edges to provide another deflection of gas flow through the mist eliminator beyond the first layer.

The above, and other objects, features and advantages of the present invention will be apparent to those skilled in the art from the following detailed description of an illustrative embodiment thereof when read in connection with the accompanying drawings, wherein:

FIG. 6 is a view similar to FIG. 2 of a still further embodiment of the present invention;

FIG. 7 is a view similar to FIG. 2 of yet a further embodiment of the present invention.

Figure 1:
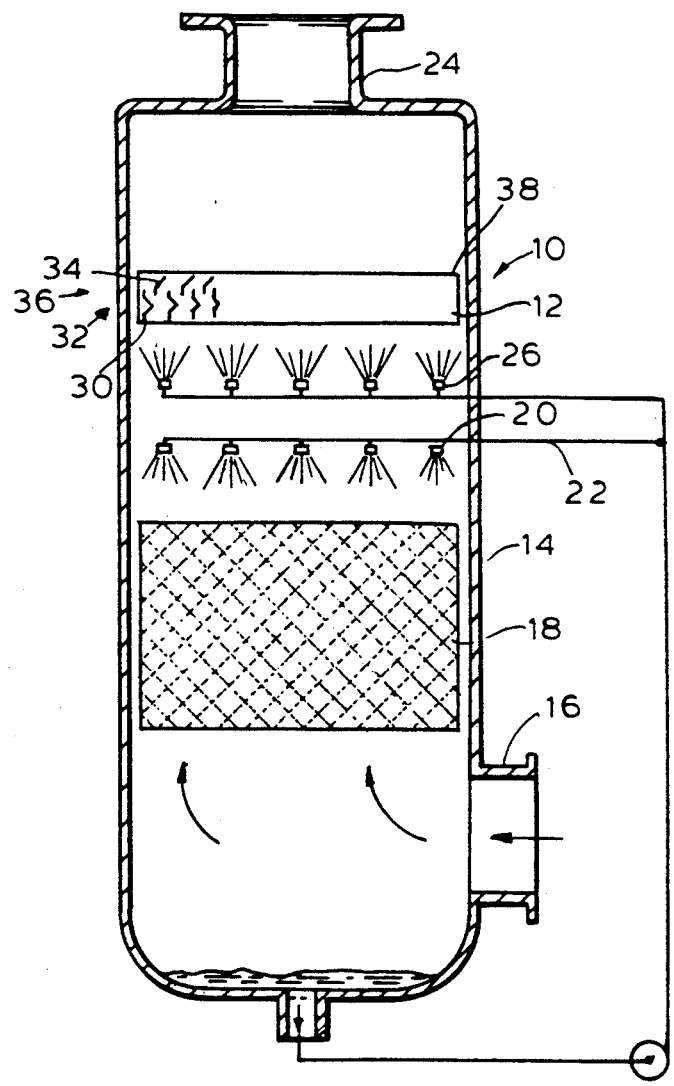
FIG. 1 is a schematic side sectional view of an apparatus for treating gas, such as a scrubber or washing tower including a mist eliminator structure constructed in accordance with the present invention.
Figure 8:
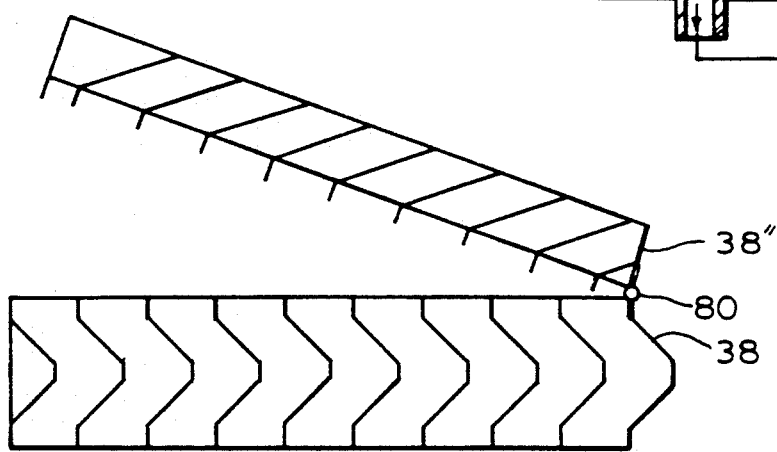
FIG. 8 is a side view on a reduced scale of a mist eliminator body constructed in accordance with the present invention wherein the upper layer is pivotally mounted with respect to the lower layer.

Referring now to the drawings in detail and initially to FIG. 1 thereof, a scrubber or tower 10 for washing gases is illustrated which is generally of known construction but which includes a mist eliminator body 12 constructed in accordance with the present invention. The scrubber typically comprises a cylindrical housing 14 having an inlet 16 for waste gases to be cleaned. Mounted within housing 14, in any convenient manner, is a fill or pack body 18 of any desired known trickle washer construction. In a preferred embodiment this pack consists of layers of cross-corrugated fill, formed of synthetic materials, or the like.

A plurality of water spraying nozzles 20, connected to a source of wash water 22 is located directly above fill body 18. In the known operation of these devices, the water or other liquid deposited o the top surface of the fill pack 18 flows along the surfaces of the pack in contact with the dirty gases to be scrubbed and removes impurities from the gases. The flow of the gases, however, does entrain some liquid droplets in it as the gas flows out of the fill pack.

After the gas leaves the fill pack, it flows upwardly to the mist eliminator 12. The purpose of the mist eliminator (also referred to as a particle separator in the art) is to entrap and remove any entrained liquid droplets from the gas flowing upwardly in tower 14 to exhaust 24. A series of spray nozzles 26 may be provided beneath mist eliminator 12 for intermittent operation in order to spray water on and into the mist eliminator and remove impurities that are trapped on the plates of the mist eliminator with the entrained liquid droplets. If desired, the scrubber may include a similar array of washer nozzles directed downwardly against the top of mist eliminator 12 for intermittent washing operations.

In accordance with the present invention the mist eliminator body 12 has a unique construction consisting of two or more layers of partitions or panels defining a circuitous flow path for the gas through the mist eliminator body. In the illustrative embodiment, the mist eliminator is formed from a plurality of partitions 30 defining a first layer 32 in the mist eliminator body and a second layer 36 of partitions 34. These partitions are formed of any known material, preferably polyvinylchloride or the like, and generally have irregular configurations, as described hereinafter. The surfaces of the partitions may be corrugated to aid in entrapping liquid droplets, and they may have collection pockets formed thereon (not shown in the drawing) as disclosed, for example, in U.S. Pat. No. 3,953,183. The panels are mounted at their ends in a peripheral frame 38 in any convenient manner.

Figure 2:
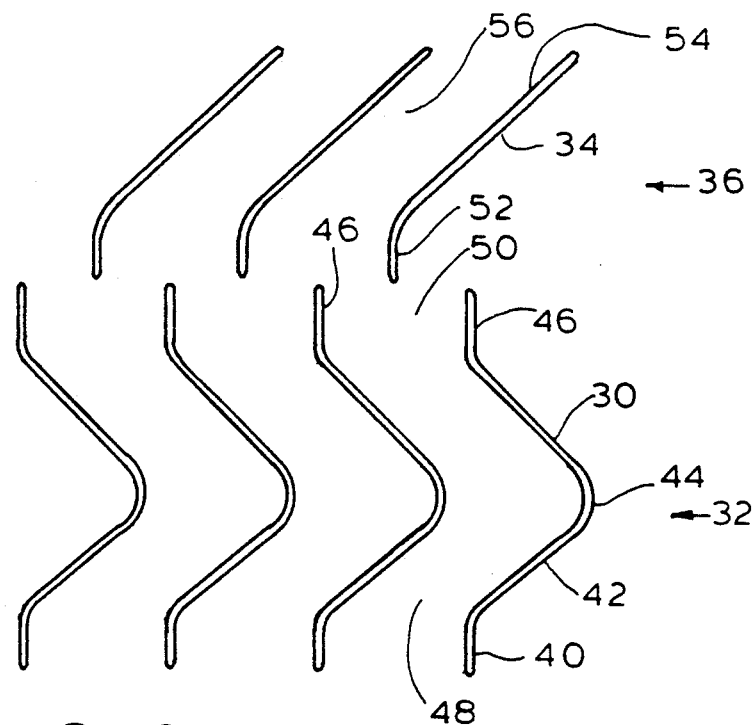
FIG. 2 is a partial side sectional view of a mist eliminator body constructed in accordance with one embodiment of the present invention.

FIG. 2 illustrates an enlarged view of the partitions 30, 34 which form the layers 32, 36 of the mist eliminator. As seen therein, partitions 30 of the lower or first layer 32 are positioned in spaced generally parallel relationship to each other and have essentially the identical configuration. These partitions include straight or flat inlet edge portions 40, V-shaped central portions 42 having an arcuate bight 44 and a flat exit portion 46. Partitions 30 define circuitous channels 48 therebetween for the gas mixture flowing out of pack 18. The gas is guided by exit flanges 46 in a straight flow path of travel through exit ports 50.

The second layer 36 in the mist eliminator pack also has its partitions 34 located in spaced parallel relationship to each other. In this embodiment the partitions have straight inlet edge portions 52 and inclined main body portions 54. The partitions define flow paths or channels 56 therebetween for gas exiting the first layer. As seen in FIG. 2, the inlet edges of the partitions are offset from the outlet edges of the first layer. As a result, air flowing from an exit port 50 between two adjacent partitions of the first layer is divided between two channels 56 in the second layer. In this embodiment the extreme ends of the edges 46, 52 lie in essentially the same horizontal plane.

Figure 3:
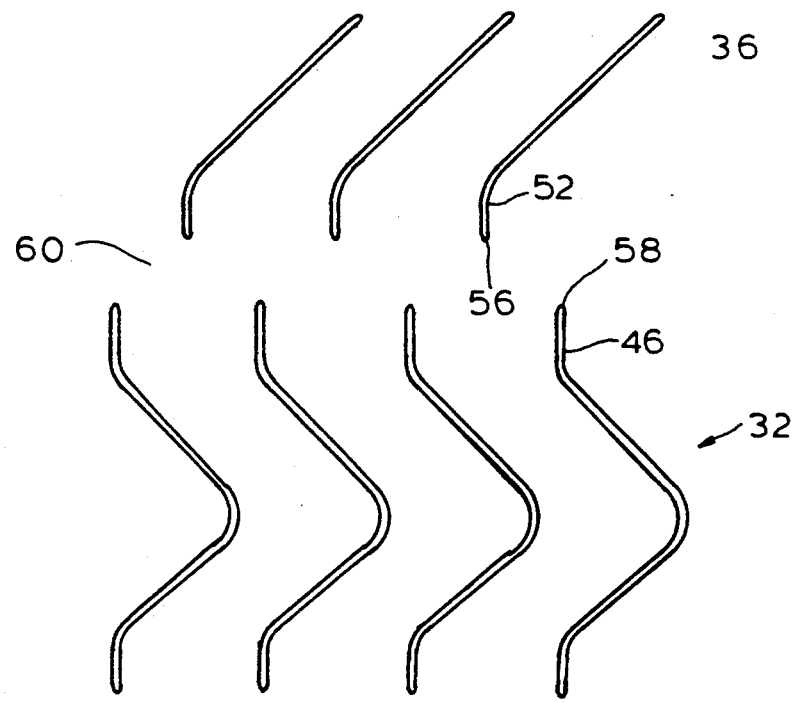
FIG. 3 is a view similar to FIG. 2 of another embodiment of the present invention.

Another embodiment of the invention is illustrated in FIG. 3 wherein the first and second layers 32 and 36 are formed of the same shaped partitions as described above with respect to FIG. 2, but in this embodiment the ends 56, 58 of the edges 46, 52 are spaced from each other to define a gap 60 between the layers which promotes mixing of the gas streams.

Figure 4:
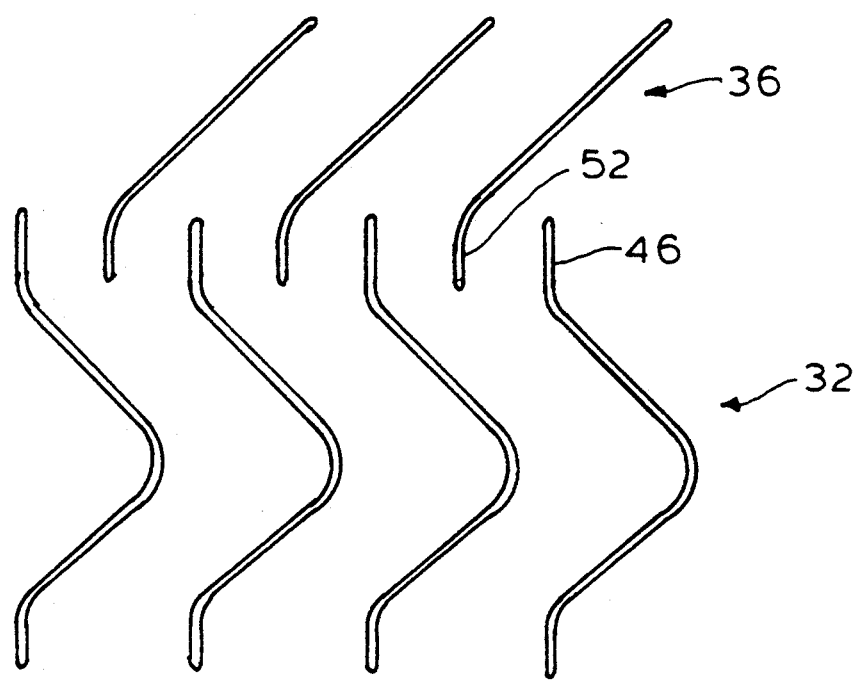
FIG. 4 is a view similar to FIG. 2 of a further embodiment of the present invention.
Figure 5:
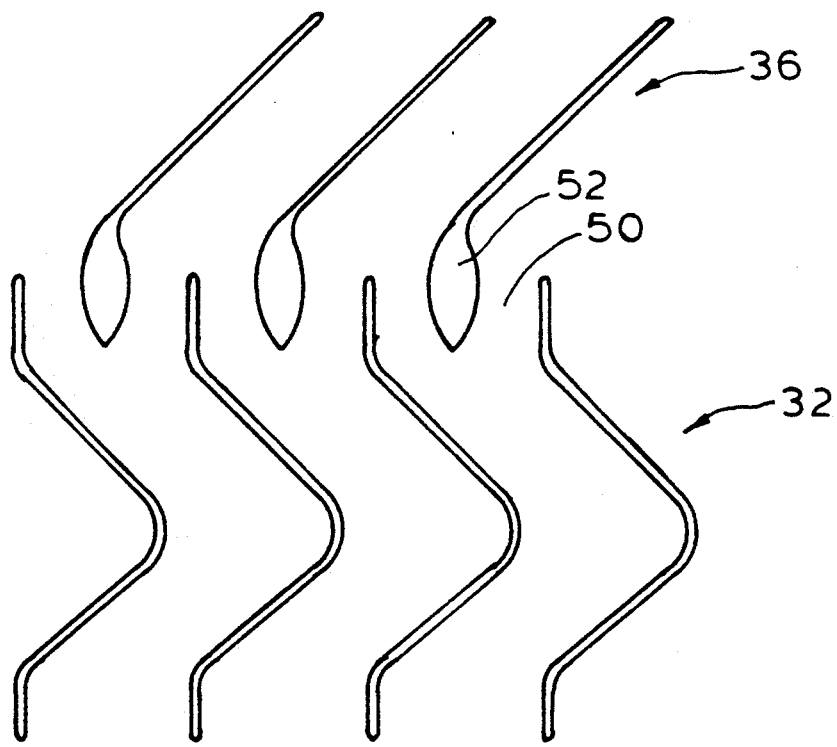
FIG. 5 is a view similar to FIG. 2 of still another embodiment of the present invention.

In yet another embodiment of the invention, illustrated in FIG. 4, the flat inlet edges 52 of the upper layer 36 are positioned between the outlet edges 46 of lower layer 32.

By this construction of the mist eliminator body, water sprayed from nozzles 26 below the mist eliminator body 10 will have better access to the upper layers for cleansing those layers because of the offsetting of the partitions. Likewise, should cleansing water be provided from the top of the mist eliminator body, better access is provided to the lower layer for cleansing action.

In yet another embodiment of the invention illustrated in FIG. 5, the inlet edges 52′ of upper layer 36 are shaped in a generally teardrop shaped configuration in cross-section thereby to narrow the exit passages 50 from lower layer 32. As a result, gas flow is accelerated as it exits the lower layer and enters the upper layer. This accelerated gas flow improves the separation efficiency of the mist eliminator for smaller droplets of liquid in the gas stream, because of the effects of inertia. As illustrated in FIG. 7, this effect can be further increased by providing teardrop-shaped exit edges 46′ for the partitions of the lower layer 32, thereby further increasing acceleration of the gas stream and separation efficiency for smaller droplets.

In the embodiments of FIGS. 5 and 7, the inlet edges 52′ of the upper layer 36 are illustrated as being generally streamlined teardrop shapes. However, if desired, these edges may be shaped as illustrated in FIG. 6 as generally inverted V-shaped members 52′ which open downwardly in the direction of gas flow to define capture chambers 70 which intercept and separate liquid droplets from the air stream.

In another embodiment of the invention, the individual partitions in the layers 32, 36 can be mounted in separate frames, which are snap fit or otherwise connected to one another for removal and separation as desired. This provides easier access to the interior of the mist eliminator to improve cleansing action.

In another embodiment illustrated in FIG. 8, the upper and lower layers are mounted in separate frames 38′, 38″ which are pivotally connected by a hinge 80 or the like to permit access to the interior of the mist eliminator for improved cleansing action.

Although the partitions illustrated in the drawings of this application have relatively smooth curved and straight surfaces, the partitions or profiles may be equipped with trap pockets or separating chambers as described in the above-referenced patents.

The mist eliminator blades or profiles of the invention can be formed of metal such as stainless steel, aluminum or plastic such as polyvinylchloride, polypropylene or other high-temperature thermoplastic materials. The shaping of the partitions can be effected in any convenient manner.

Although illustrative embodiments of the invention have been described herein with reference to the accompanying drawings, it is to be understood that various changes and modifications may be effected therein by those skilled in the art without departing from the scope and spirit of this invention.

What is claimed is:

1. A mist eliminator for removing liquid droplets from a gas stream comprising a first layer of a plurality of mutually parallel spaced partitions defining respective flow channels between said partitions, said partitions being curved to define said flow channels as circuitous paths of travel for the gas, and having free edge portions defining exit ports for said channels, and a second layer of a plurality of mutually spaced partitions defining respective flow channels therebetween, said partitions of the second layer being located downstream of said first layer in the direction of air flow and having inlet edges in alignment with said exit ports and offset from the free edge portions of the partitions in the first layer, said inlet edges being aligned with the direction of gas flow out of said exit ports, said partitions of said second layer having main body portions extending at an angle to s id inlet edges.

2. A mist eliminator as defined in claim 1, wherein said inlet edges are spaced from said free edge portions by a predetermined distance downstream of said free edge portions.

3. A mist eliminator as defined in claim 2, wherein said inlet edges are located between and parallel to said free edge portions of the partitions of the first layer.

4. A mist eliminator as defined in claim 1, wherein said inlet edges are non-planar in cross-section and have a maximum cross-sectional thickness greater than the remainder of its partition thereby to define a restriction in the flow path for gas at the exit ports of the first layer.

5. A mist eliminator as defined in claim 4, wherein said inlet edges are generally streamlined teardrop shaped in cross-section.

6. A mist eliminator as defined in claim 5, wherein said free edge portions of the partitions in the first layer are also generally streamlined teardrop shaped in cross-section.

7. A mist eliminator as defined in claim 4, wherein said inlet edges generally have an inverted generally V-shaped cross-section with the inverted V-shaped opening in the direction of gas flow out of said exit ports.

8. A mist eliminator as defined in claim 4, wherein said partitions of the second layer are mounted in a common frame which is pivotally connected to said first layer.

9. A mist eliminator for removing liquid droplets from a gas stream comprising a first layer of a plurality of mutually parallel spaced partitions, said partitions having identical folded configurations defining circuitous flow channels therebetween for the gas and having straight parallel exit edges defining exit ports for said channels, and a second layer formed of a plurality of mutually spaced partitions defining flow channels therebetween offset from the flow channels of the first layer whereby gases flowing from the channels of the first layer are divided to two adjacent channels of the second layer; said partitions of the second layer being located downstream of said first layer in the direction of air flow and having inlet edges located in alignment with said exit ports and offset from said exit edges of the first layer; said inlet edges being flat and generally parallel to said exit edges thereby to be aligned with the direction of gas flow out of said exit ports, said partitions of said second layer having main body portions extending at an angle to said inlet edges.

10. A mist eliminator as defined in claim 9, wherein said inlet edges are spaced from said exit edges by a predetermined distance downstream of said free edge portions.

11. A mist eliminator as defined in claim 9, wherein said inlet edges are located between and parallel to said exit edges of the partitions of the first layer.

12. A mist eliminator as defined in claim 11, wherein said exit edges are non-planar in cross-section and have a maximum cross-sectional thickness greater than the remainder of its partition thereby to define a restriction in the flow path for gas at the exit ports of the first layer.

13. A mist eliminator as defined in claim 12, wherein said exit edges are generally streamlined teardrop shaped in cross-section.

14. A mist eliminator as defined in claim 13, wherein said exit edges of the partitions in the first layer are also generally streamlined teardrop shaped in cross-section.

15. A mist eliminator as defined in claim 12, wherein said exit edges generally have an inverted generally V-shaped cross-section with the inverted V-shaped opening in the direction of gas flow out of said exit ports.

16. A mist eliminator as defined in claim 12, wherein said partitions of the second layer are mounted in a common frame which is pivotally connected to said first layer.

* * * * *